(No Model.)

J. J. TOMEY.
PIPE AND ROD WRENCH.

No. 472,153. Patented Apr. 5, 1892.

Witnesses
Chas. A. Ford.
W. S. Duvall.

Inventor
John J. Tomey.
By his Attorneys,
C. A. Snow & Co.

UNITED STATES PATENT OFFICE.

JOHN J. TOMEY, OF WASHINGTON, INDIANA, ASSIGNOR OF ONE-HALF TO NATHAN B. RUSSELL, OF SAME PLACE.

PIPE AND ROD WRENCH.

SPECIFICATION forming part of Letters Patent No. 472,153, dated April 5, 1892.

Application filed January 2, 1892. Serial No. 416,842. (No model.)

*To all whom it may concern:*

Be it known that I, JOHN J. TOMEY, a citizen of the United States, residing at Washington, in the county of Daviess and State of Indiana, have invented a new and useful Pipe and Rod Wrench, of which the following is a specification.

This invention relates to improvements in pipe and rod wrenches, the objects in view being to provide a wrench embodying simplicity, strength, and durability that may be readily applied to and removed from a pipe or rod, and when applied, though firmly gripping the same, the nut will not have a tendency to crush or mar the pipe or rod.

With the above and other objects in view the invention consists in certain features of construction hereinafter specified, and particularly pointed out in the claims.

Figure 1:
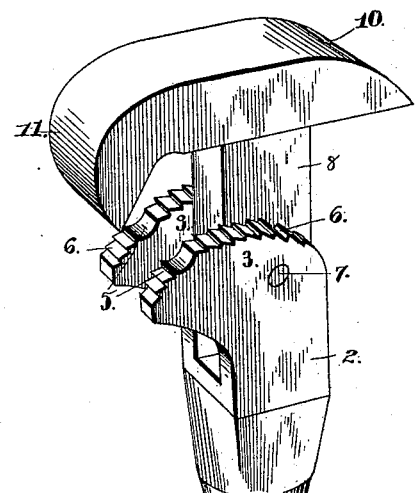
Figure 2:
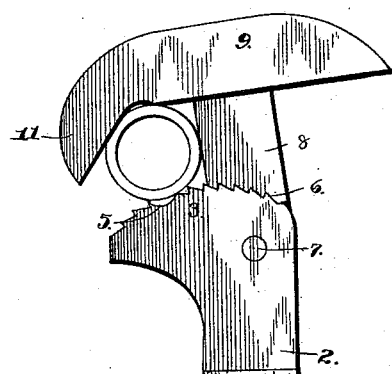
Figure 3:
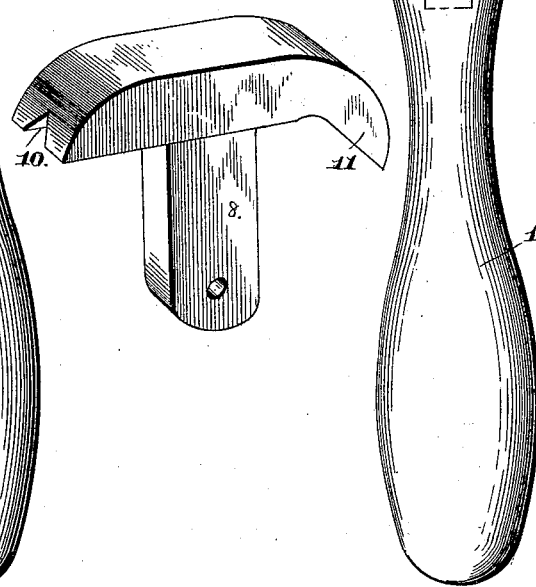

Referring to the drawings, Figure 1 is a perspective of a wrench constructed in accordance with my invention. Fig. 2 is a side elevation of the same in position upon a pipe. Fig. 3 is a detail in perspective of the pivoted jaw.

Like numerals of reference indicate like parts in all the figures of the drawings.

1 designates the shank or handle, which is exteriorly formed to provide a convenient grip. In this instance the shank or handle is of metal; but, as will be obvious, the same may be formed of wood, and the head hereinafter described as a part of the handle may be secured thereto, as shown by dotted lines in Fig. 2. In this instance, however, the shank or handle, as shown, merges into a head 2, which is transversely recessed, forming a pair of opposite or twin jaws 3. These jaws have their upper edges curved, as shown, and project forwardly at one side beyond the shank or handle 1. The jaws are provided in their forward portions and curved edges with concaved seats or recesses 5 and at opposite sides of the recesses the jaws are toothed, as at 6.

Pivoted as at 7, between the jaws 3 and eccentrically with relation to the curved edges of the jaws, is a tenon 8, which some distance above the jaws terminates in a head 9 of a width equaling the jaws and extending at both sides of the tenon 8. The rear end of the head is preferably notched to form a claw or nail-pull 10, while the opposite end is forwardly and downwardly extended, constituting the beak 11, the inner edge of which is concentric with the curved toothed jaws 3.

In operation the handle is turned till the head 9 swings down by gravity, thus opening the jaws, after which the beak of the head 8 is engaged under the pipe or rod. Now by drawing the handle toward the operator the curved edges 6 will bind upon the pipe or rod, and thus grip the same in such a manner as to render slipping an impossibility. By moving the handle in the opposite direction or away from the operator the jaws will immediately unbind from the pipe or rod, so that the wrench may be swung to the rear for a new grip, and thus by continuous operations of this kind the pipe may be unscrewed or screwed.

From the foregoing description, in connection with the accompanying drawings, it will be seen that I provide a wrench embodying both simplicity and strength, as well as durability, and that the same may be easily applied or removed to and from a pipe or rod, and may be gripped and ungripped with facility and ease and without loss of time.

It will be seen that by reason of the curved recess or seat formed in the curved edges of the fixed jaws the pipe or rod is prevented from becoming bruised or marred when gripped by the jaws.

Having described my invention, what I claim is—

1. In a wrench of the class described, the combination, with the handle terminating at its upper end in a pair of jaws extended to one side of the handle and having curved toothed edges, of a tenon eccentrically pivoted between the jaws and terminating at its upper end in a head which is provided at one side of the tenon with a beak eccentric with the curved jaws, substantially as specified.

2. In a wrench of the class described, the combination, with the handle terminating at its upper end in a head transversely bifurcated to form a pair of jaws disposed to one side of the handle and having their upper edges curved and provided with a shallow recess and at each side thereof with teeth, of a tenon located between the jaws, a pin pivoting the tenon eccentrically with relation to the curved edges of the jaws, and a head integrally formed with the tenon located at the upper end of the same and terminating opposite the jaws in a beak 11, eccentrically disposed with relation to the curved edges of the jaws, substantially as specified.

In testimony that I claim the foregoing as my own I have hereto affixed my signature in the presence of two witnesses.

JOHN J. TOMEY.

Witnesses:
ALEXANDER M. HARDY,
E. H. GOSLIN.